United States Patent
Taylor

(10) Patent No.: US 6,265,482 B1
(45) Date of Patent: Jul. 24, 2001

(54) RESOLE RESIN SYSTEM FOR PULTRUSION COMPOSITES

(75) Inventor: John G. Taylor, Louisville, KY (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/157,952

(22) Filed: Sep. 22, 1998

(51) Int. Cl.$^7$ ..................................................... C08K 3/00
(52) U.S. Cl. .......................... 524/594; 524/439; 524/440; 524/441; 524/494; 524/495
(58) Field of Search ................................. 524/594, 494, 524/495, 496, 438, 440, 441

(56) References Cited

U.S. PATENT DOCUMENTS

| | | |
|---|---|---|
| 3,485,797 | 12/1969 | Robins . |
| 4,311,631 | 1/1982 | Myers et al. . |
| 4,427,797 | 1/1984 | Smith . |
| 4,430,491 | 2/1984 | Culbertson et al. . |
| 4,613,662 | 9/1986 | Goel . |
| 4,639,505 | 1/1987 | Goel . |
| 5,075,413 | 12/1991 | Dailey, Jr. . |
| 5,075,414 | 12/1991 | Dailey, Jr. . |
| 5,243,015 | * 9/1993 | Hutchings et al. ................. 528/129 |
| 5,344,909 | 9/1994 | Hutchings et al. . |
| 5,362,545 | 11/1994 | Tingley . |
| 5,456,781 | 10/1995 | Tingley . |
| 5,498,460 | 3/1996 | Tingley . |
| 5,547,729 | 8/1996 | Tingley . |
| 5,565,257 | 10/1996 | Tingley . |

* cited by examiner

Primary Examiner—Edward J. Cain
(74) Attorney, Agent, or Firm—Stevens, Davis, Miller & Mosher L.L.P.

(57) ABSTRACT

A pultrusion process employing a resole-resorcinol resin system, having a much improved pot life and much lower formaldehyde odor over similar existing systems where the resole contains up to 3.5%, preferably 3%, most preferably not more than about 1.5% free formaldehyde.

22 Claims, 3 Drawing Sheets

RESOLE RESIN SYSTEM FOR PULTRUSION COMPOSITES

BACKGROUND OF THE INVENTION

1. Field of the Invention

This invention relates to resole resin systems for use in pultrusion processes having longer pot life and low free formaldehyde emission, pultrusion composites comprising a plurality of filaments bonded together by a resole resin having a resorcinol novolac hardener and pultrusion processes employing the novel resin system.

2. Description of the Related Art

"Pultrusion" is a well known term of art to describe the drawing of a plurality of fibrous reinforcement coated with a binding solution, through a die in order to shape the fibrous reinforcement and binder into a unitary article of desired shape.

Prior uses of fibrous reinforcement, such as glass fibers, have permitted the formation of varying shapes by the pultrusion process so as to provide a composite structural member which are typically stronger and lighter and may be less expensive than similarly sized single material members, such as wood, and thus, can be used as a competing product to conventional wood or metal structural materials. One particular product of interest is primarily for off-shore platforms, e.g. pultruded grate systems for ships and off-shore oil wells.

Tingley, U.S. Pat. No. 5,456,781, generally illustrates, in FIG. 3, a schematic for a pultrusion process in which a plurality of fiber rovings are pulled through a resin bath and then a forming die and subsequently through a heated die that cures the resin materials and shapes the rovings and resin. Preferred rate through the pultrusion apparatus is 3–5 feet/minutes (0.9–1.5 m/minute). Although glass fiber has been mentioned as the fiber filaments or rovings, other materials, including synthetic fibers, carbon fibers and inorganic fibers, e.g. ceramic fibers, can be used as the filaments or rovings. Suitable for use as fibers in tension are aramid fibers, which are commercially available from E.I. Dupont de Nemours & Company of Delaware under the trademark "KEVLAR" and high modulus polyethylene which is available under the trademark "Spectra" from Allied Fibers of Allied Signal, Petersburg, Va. Synthetic fibers preferably having a modulus of elasticity in tension that is relatively high. For example, synthetic fibers of KEVLAR™ have a modulus of elasticity and tension of about $18 \times 10^6$ psi (124,000 MPa).

Suitable for use as compression fibers are carbon fibers such as commercially available carbon fibers which have a modulus of elasticity in compression in a range of about $34 \times 10^4$ to $36 \times 10^4$ PSI (234,000–248,000 Mpa).

As suitable resin materials are mentioned epoxy, polyester, vinyl ester, phenolic resins, polyamides, or polystyrylpyridine (PSP) or thermoplastic resins, such as polyethylene terapthylate (PET) and nylon-66.

It is also been known to use a phenolic resin containing resorcinol, such as a commercially available phenolic resin containing about 0–60% resorcinol, which is commercially available under the trade designation RESORCIPHEN® 2074A-2026B now owned by Borden Chemical, Inc. of Columbus, Ohio.

These phenolic resins containing resorcinol are disclosed in the Dailey U.S. Pat. Nos. 5,075,413 and 5,075,414. The resorcinolic component is selected from resorcinol and resorcinol formaldehyde novolak resin. This is reacted with a phenolic resole resin which has a room temperature cure in as little as eight hours. In addition, a methylene donor may be employed in the reaction.

The entire subject matter of the aforementioned '781, '413 and '414 patents are herein incorporated by reference.

While such products according to the prior art do produce a resin bound composite of fibers, the difficulty with the prior art phenolic resin systems containing resorcinol is a short pot life (low stability) and high formaldehyde emission, which are a source of pollutants of the atmosphere.

SUMMARY OF THE INVENTION

Accordingly, it is primary object of the invention to provide new resin systems, a pultrusion process employing the new resin systems and shaped products, which are free of the disadvantages of the prior art.

Another object of the invention is to provide a pultrusion process utilizing an improved resin system which has a much improved pot life over the heretofore known resin systems.

It is a still further object of the invention to provide a pultrusion process utilizing the new resin systems of the invention, such that much lower formaldehyde emissions and odor estimate from the process.

Additional objects and advantages of this invention will be apparent from the following detailed description of preferred embodiments thereof.

DETAILED DESCRIPTION OF PREFERRED EMBODIMENTS

Figure 1:
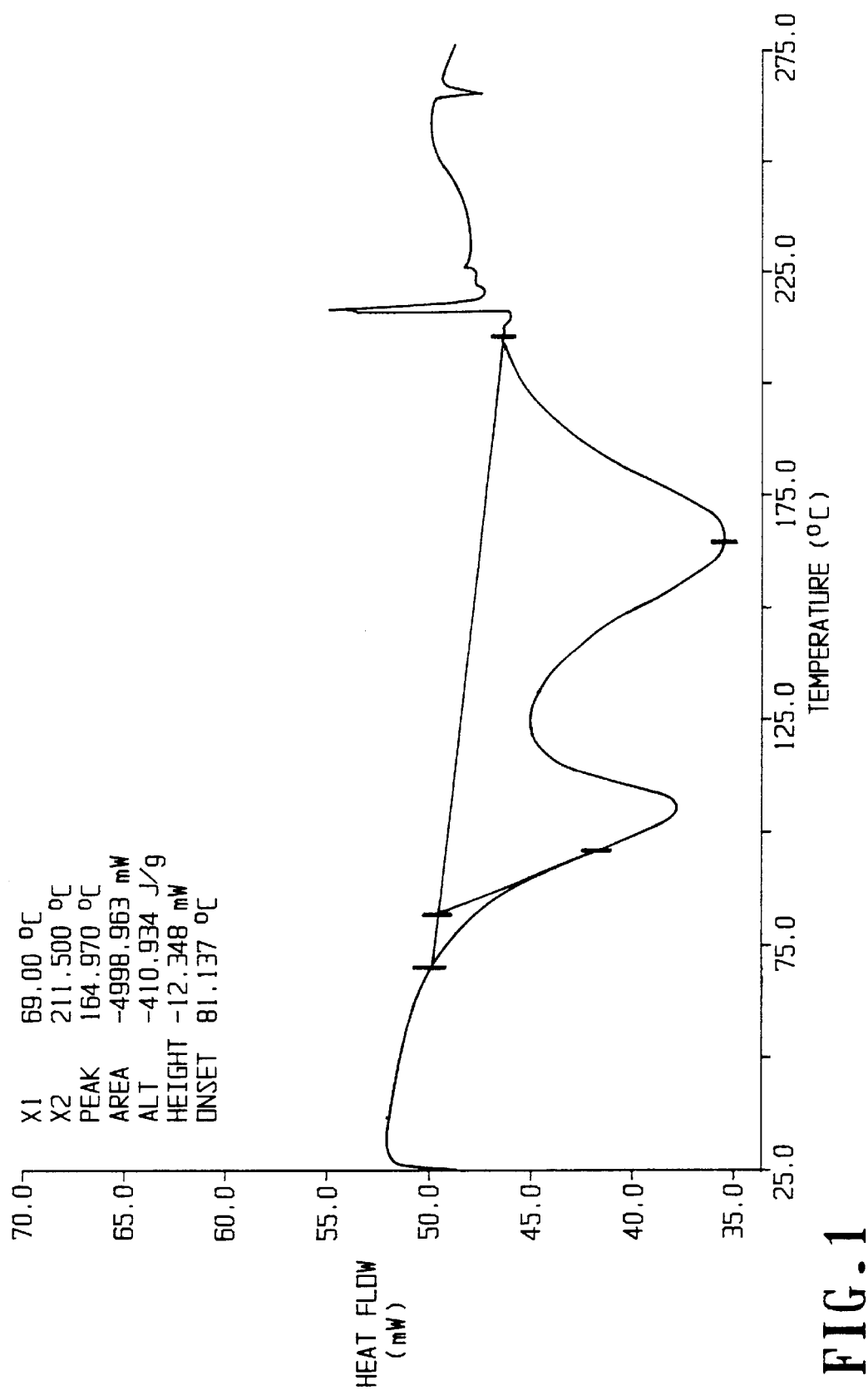
FIG. 1 is a DSC curve of a resole resin having a high free formaldehyde content with a hardener according the prior art.

A pultrusion process is disclosed in which fibrous reinforcement, such as where filaments are grouped together into strands or fibers, which may be grouped together into twisted strands to form yarns, or untwisted strands to form rovings of a fibrous material or which may be bound together as continuous or chopped strands to form mat, such as of a glass, ceramic, thermosetting or thermoplastic resin, which are drawn through a bath of liquid resin and then through a pultrusion die to shape the fibrous reinforcement and resin composite which, upon heating, will cure the shaped material.

In one embodiment of the invention, the shaping die and heating source, such as a heated die, may be separate elements to perform separate functions, i.e. one to shape without cure and the other to maintain the shape and/or reshape the material and heat the material to cure the resin component.

In an alternative embodiment of the invention, the shaping and heating die may be an integral unit so as to perform both functions in one single element.

As suitable fibers are any of the fibers known for pultrusion processes in the prior art, including but not limited to carbon fibers, ceramic fibers, metal fibers, synthetic resin fibers, including thermosetting and thermoplastic types, especially aramid fibers and high modulus polyethylene, glass fibers, other inorganic fibers such as composite ceramic fibers and metal fibers, and combinations thereof. The fibrous reinforcement may be in filament form or may be in the form of fiber rovings or yarns or in a mat or veil form. As is known in the art, filaments are grouped together into strands or fibers, which may be further grouped together into twisted strands to form yarn, or untwisted strands to form rovings or mat. The content of the fibrous reinforcement and nature thereof will vary according to the desired strength but usually is in a range of 60–85% by weight, preferably 70–80% by weight.

In whatever form the fiber reinforcing material is presented, the fibers are preferably fed from bobbins (spools) through openings in an alignment card that aligns the reinforcement material and prevents it from entangling. The fibrous reinforcement will pass from the alignment card to a first comb that gathers them and arranges them parallel to one another and then passes over a tensioning mandrel under a second alignment cone and through close fitting eyelets directly into a resin bath, where the reinforcement material is thoroughly wetted with a resin material.

However, contrary to the resin materials known in the prior art, the present process uses a resole resin with a resorcinol/novolac hardener as the binding material which provides longer pot life and reduced emissions.

The primary component of the system is a phenolic resole, which is combined with a component selected from the group consisting of resorcinol and resorcinol-formaldehyde novolac resin and combinations thereof as a hardener. This combination of the phenolic resole and resorcinol/novolac mixture has a pot life which is several times longer than that of other resole-resorcinol systems that are currently available. Additionally, the formaldehyde emissions that occur during processing of the resole-resorcinol novolac system of the invention are much lower than those that come from other resole-resorcinol systems that are currently available.

For example, the system previously described as Borden Chemical, Inc.'s RESORCIPHEN® 2074A-2026B resin system where the 2074A (Zinc Acetate Catalyzed Resole) and 2026B Hardener (Resorcinol Novolac) components used in combination as a pultrusion resin had a pot life of about eight hours before the resin began to exotherm and gel. The 2074A resole contains about 7% free formaldehyde.

By contrast, a zinc acetate catalyst resole was used containing up to 3.5%, preferably up to 3%, most preferably not more than or equal to 1.5% free formaldehyde in combination with the 2026B hardener in levels ranging from 10 to 30% with the remainder being the resin resole. Surprisingly, the resulting mixture had a pot life of over two days. Though not wishing to be bound by the mechanism, it is believed that the higher free formaldehyde content in the 2074A resole reacts with the high free resorcinol in the 2026B hardener to initiate the reaction and shorten the pot life (minimum life). This is evidenced by the Differential Scanning Calorimetry (DSC) profile (FIG. 1) of the now Borden Chemical, Inc.'s 2074A/2026B combination. This profile has two exotherm peaks, wherein the first is believed to be the formaldehyde/resorcinol reaction and the second peak is the result of a cross-linking reaction.

By contrast the DSC profile (FIG. 2) of the resin of the present invention showed one broad peak. Furthermore, the onset temperature of exotherm for the resin mixture of the present invention is higher, which also suggests a longer pot life.

The much lower free formaldehyde content of the present resin has the further advantage of lowering the formaldehyde emissions that result from curing in the pultrusion die.

Resin mixtures that were evaluated are identified in the attached table, along with their associated mechanical properties. The temperature column on the table refers to the pultrusion die (12 inches long), entrance and exit temperatures, respectively. Die temperatures were determined by using DSC curves of freshly mixed systems to determine onset of exotherm, peak exotherm and final cure temperatures. The pultrusion was run at a line speed of six inches per minute to give a two minute dwell in the pultrusion die. Rovings from six spools of 2788 Pittsburgh Plate Glass glass fiber were pulled simultaneously through a resin bath and then through the heated die to provide the glass substrate. Pultruded specimens are all approximately 70% glass.

Figure 2:
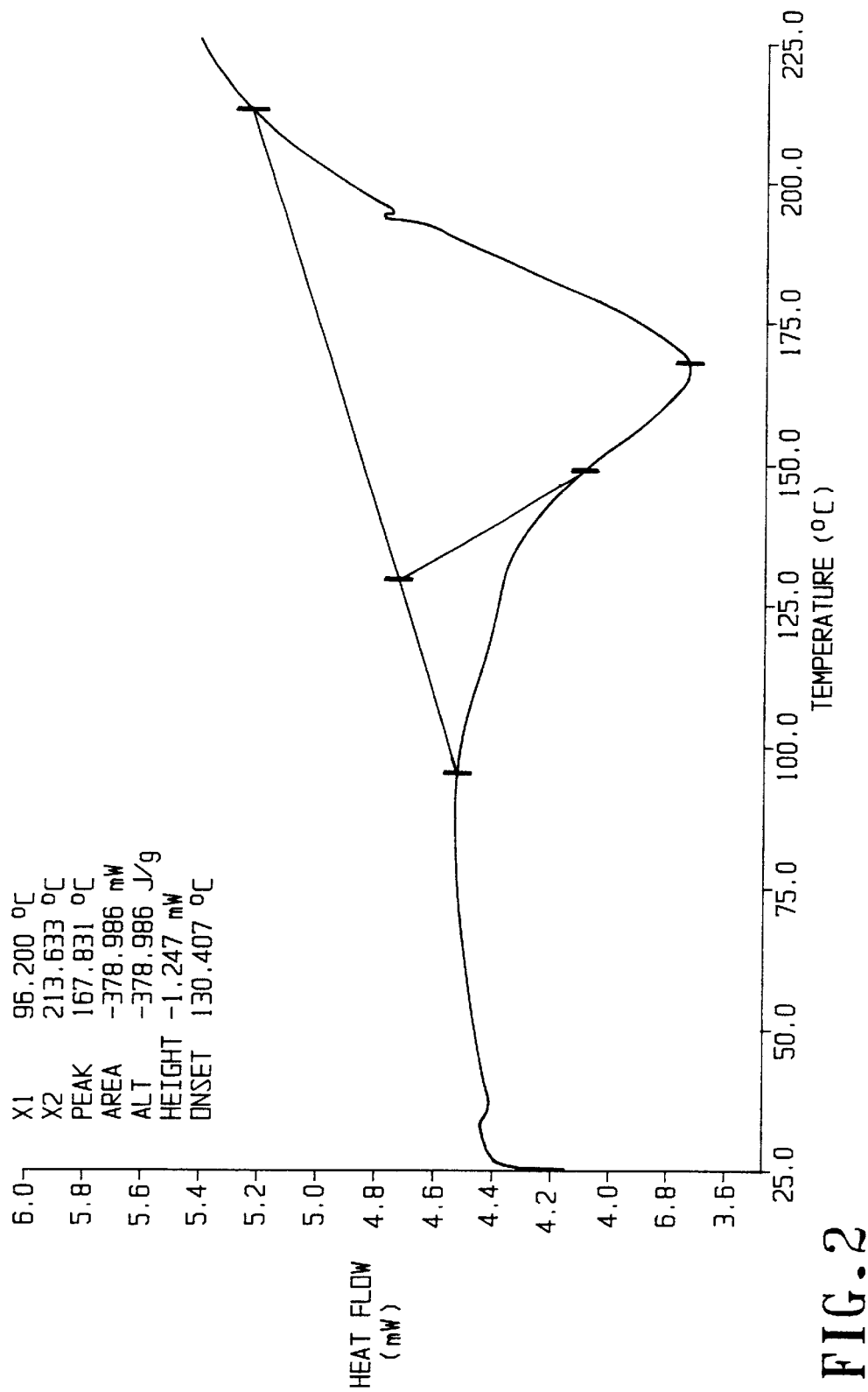
FIG. 2 is a DSC curve of a resin system according to the invention.
Figure 3:
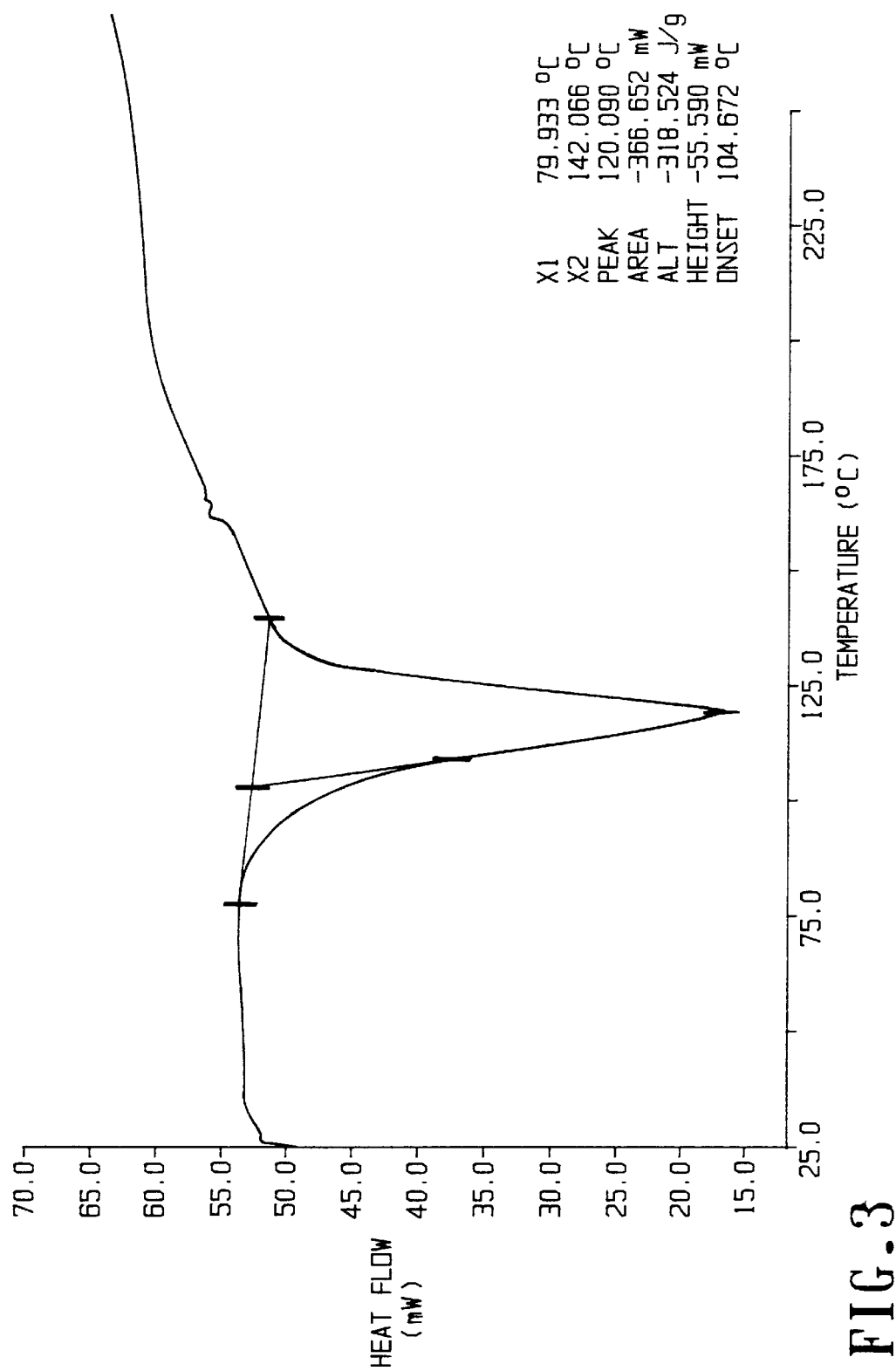
FIG. 3 is a DSC curve of a comparative system.

The DSC curve show different behaviors for each system. The 2074A/2026B (prior art system) curve (FIG. 1) gives two peaks, with the first peak being attributed to the resorcinol reaction with the high amount of free formaldehyde in the 2074A part resin. The resin of the present system gives a very broad single peak and a higher onset temperature (FIG. 2). A further comparative system (FIG. 3) gives a single sharp peak. The broad peak implies an extended time from the beginning of cure to final cure, which may allow volatiles to more effectively escape, while improving resin flow around the fibrous reinforcement.

Additives that are commonly used in pultrusion formulations include but are not limited to $BaSO_4$ filler, talc, walnut shell flour, aluminum hydrate filler and an internal release agent. Other additives can include copper and graphite. The results are found in the following Table I:

TABLE I

Lab Pultruder Results, Sorted by Shear Load Yield

| Sample | Temp | Resole | Novolak | Level | Filler | F Level | Flex St | Load, lbs. | Flex Mod | Energy | SBS | Load lbs |
|---|---|---|---|---|---|---|---|---|---|---|---|---|
| 1171971 | 260,400 | 2074 | 2026 | Std | Brake | 40 | 113.5 | 150.4 | 5208 | 9.3 | 5786 | 243 |
| 1171975C | 320,410 | 822 | 2026 | 20 | none | | 204.1 | 174.3 | 7169 | 16.6 | 7550 | 243 |
| 1171993B | 260,400 | 822 | 2026 | 20 | BaSO4 | 10 | 151.6 | 154.7 | 6384 | 11.19 | 6863 | 235 |
| 1172022 | 280,410 | 822 | 224C | 20 | BaSO4 | 10 | 141.4 | 159.3 | 6008 | 11.33 | 6065 | 227 |
| 1171991B | 260,400 | 2074 | 2026 | Std | BaSO4 | | 163.8 | 146 | 7497 | 10.59 | 6795 | 225 |
| 1171994 | 300,410 | 822 | 2026 | 30 | BaSO4 | 10 | 162.3 | 141.4 | 7160 | 10.71 | 6656 | 219 |
| 1171992B | 260,400 | 822 | 2026 | 10 | BaSO4 | 10 | 117.4 | 146.2 | 5233 | 9.48 | 5411 | 221 |
| 1171974 | 260,400 | 822 | 2026 | 10 | none | | 164.6 | 164.3 | 6614 | 12.86 | 5757 | 203 |
| 1171975 | 260,400 | 822 | 2026 | 20 | none | | 142.2 | 129.7 | 6112 | 9.53 | 6086 | 199 |
| 1171992 | 300,410 | 822 | 2026 | 10 | BaSO4 | 10 | 121.3 | 145.3 | 5498 | 9.14 | 5072 | 19 |
| 1171993 | 300,410 | 822 | 2026 | 20 | BaSO4 | 10 | 137.9 | 127.8 | 6558 | 8.62 | 5860 | 198 |
| 1172021 | 280,410 | 822 | 224C | 30 | BaSO4 | 10 | 119.6 | 151.6 | 5495 | 9.26 | 4887 | 198 |

TABLE I-continued

Lab Pultruder Results, Sorted by Shear Load Yield

| Sample | Temp | Resole | Novolak | Level | Filler | F Level | Flex St | Load, lbs. | Flex Mod | Energy | SBS | Load lbs |
|---|---|---|---|---|---|---|---|---|---|---|---|---|
| 1171974B | 280,410 | 822 | 2026 | 10 | none |  | 142.2 | 148.4 | 6303 | 10.4 | 5214 | 198 |
| 1171994B | 260,400 | 822 | 2026 | 30 | BaSO4 | 10 | 136.6 | 142.4 | 6139 | 9.72 | 5409 | 192 |
| 1172023B | 310,400 | 822 | 2026 | 20 | BaSO4 | 10 | 115.4 | 138.9 | 5434 | 8.39 | 4835 | 190 |
| 117202B | 280,410 | 822 | 2026 | 20 | BaSO4 | 10 | 132.6 | 141 | 6047 | 9.52 | 5091 | 187 |
| 1172021B | 310,400 | 822 | 224C | 30 | BaSO4 | 10 | 86.8 | 109.3 | 5248 | 5.25 | 4504 | 182 |
| 1172022B | 310,400 | 822 | 224C | 20 | BaSO4 | 10 | 116 | 142.1 | 5504 | 8.72 | 4514 | 178 |
| 1171975B | 280,410 | 822 | 2026 | 20 | none |  | 151.2 | 132.5 | 6816 | 9.72 | 5298 | 176 |
| 1171991 | 300,410 | 2074 | 2026 | Std | BaSO4 |  | 103.7 | 130.8 | 5640 | 7.07 | 4248 | 172 |
| 1171976 | 260,400 | 822 | 2026 | 30 | none |  | 153 | 127.6 | 6922 | 9.43 | 4681 | 153 |
| 1171972pc | postcure | 822 | 901 | 9 | none |  |  |  |  |  | 3270 | 131 |
| 1171972 | 200,300 | 822 | 901 | 9 | none |  | 75.8 | 98.3 | 5241 | 4.51 | 3090 | 128 |
| 1171973 | 200,300 | B22Mod | 901 | 9 | none |  | 57.2 | 62.5 | 5685 | 2.56 | 2677 | 101 |
| 117197pc | postcure | B22Mod | 901 | 9 | none |  |  |  |  |  | 2608 | 100 |

2074/2026 is the prior art Resole/hardener
822 is the resole used in the invention The resole component is preferably a benzylic ether resole which may be substituted to modify its properties. For example, "toughness" can be increased by modifying the backbone with p-phenyl phenol thus making a more linear molecule while reducing cross-link density with the bulky phenol group. Toughness is evidenced by improved strength and/or reduced cracks in the pultruded part.

The backbone can also be modified with para substituted phenols, such as nonyl-phenol imparting more flexibility by creating spaces between the molecules due to the long alkyl chains.

Another modification results from not precipitating the zinc catalyst which reduces batch to batch variation in zinc content and generally produces a DSC curve having a broad exotherm which behavior has been noted to be desirable in reducing cracks in a finished pultruded part.

The ranges of the weight percent of the components used in this invention are described in Dailey's patents. A formaldehyde solution may be substituted for paraformaldehyde to deliver the same molar quantity of formaldehyde to the resole.

The resole formulated with p-phenyl phenol has about 10 to 40 weight percent of p-phenyl phenol, preferably 20 to 30 percent; and about 25 to 55 weight percent of phenol, preferably 35 to 45 percent; and about 10 to 40 weight percent of paraformaldehyde, preferably 20 to 30 percent.

The resole formulated with nonyl phenol has about 15 to 45 weight percent nonyl phenol, preferably 25 to 35 percent; and about 25 to 55 weight percent phenol, preferably 35 to 45 percent; and about 35 to 65 weight percent of 50% formaldehyde, preferably 45 to 55 percent.

The previously described resins were used at a 4:1 mix ratio of resin to hardener and were pultruded at sufficient line speeds and temperatures to produce a fiber reinforced rod of one inch diameter. Table II describes the resulting mechanical properties.

TABLE II

MECHANICAL PROPERTIES

| RESIN SYSTEM | SHORT BEAM SHEAR (PSI ± STD. DEV) |
|---|---|
| 2074–2026 | 3,242 ± 270 |
| 822–2026 | 3,478 ± 90 |
| 459–2026 | 3,930 ± 122 |

TABLE II-continued

MECHANICAL PROPERTIES

| RESIN SYSTEM | SHORT BEAM SHEAR (PSI ± STD. DEV) |
|---|---|
| 429–2026 | 3,507 ± 118 |

2074–2026 is the prior art resole/hardener
822 is the resole used in the invention
429 is p-phenyl phenol modified
459 is nonyl phenol modified The following examples are illustrative of specific recipes known to the inventor and are shown in Table III:

TABLE III

FORMULATIONS

| Resin | A | B | C | D |
|---|---|---|---|---|
| Phenol | 100 | 100 | 41.213 | 39.049 |
| p-phenyl phenol | — | — | 26.789 | — |
| nonylphenol | — | — | — | 32.844 |
| Formaldehyde 50% | 92.5 | 92.5 | — | 47.24 |
| Zinc acetate 27.5% | 7.89 | 7.89 | 3.252 | 3.081 |
| Citric acid anhydrous | 1.18 | — | — | — |
| Water | 1.18 | — | — | — |
| Distillate | −63.0 | −63.0 | −8.655 | −27.725 |
| Ethyl alcohol 95% | 14.0 | 14.0 | 10.303 | 5.467 |
| Paraformaldehyde 92% | — | — | 27.098 | — |

The hardener is essentially the 2026B resorcinol/novolac hardener of the prior art. It is approximately 70% solids with less than 60% free resorcinol, some water and resorcinol-formaldehyde novolac polymer.

It will be obvious to those having skill in the art that many changes may be made to the details of the above-described embodiment of the invention without departing from the underlying principles thereof. The scope of the present invention should be determined, therefore, only by the following claims.

I claim:

1. A pultrusion process comprising:
   (a) wetting a source of fibrous reinforcement with a resin;
   (b) said resin comprising a phenolic resole having a free formaldehyde content of less than or equal to 3.5% by weight with a hardener selected from the group consisting of resorcinol, resorcinolic novolac and combinations thereof;

(c) passing said resin wetted fibrous reinforcement through a shaping die to form a shaped fiber reinforced composite; and (d) hardening said shaped composite by the application of heat.

2. The process of claim 1 wherein said resin has a pot life of more than two days.

3. The process of claim 1 wherein said fibrous reinforcement is in the form of mat and roving.

4. The process of claim 1 wherein the shaping die and heating are performed by an integral heated die.

5. The process of claim 1 wherein the shaping die and heating are accomplished in separate sequential steps.

6. The process of claim 1 wherein the fibrous reinforcement is selected from a material from the group consisting of fibers of glass, metal, synthetic resin, carbon, metal oxide and mixtures thereof.

7. The process of claim 1 wherein the resole is formulated with about 10 to about 40 weight percent of p-phenyl phenol.

8. The process of claim 7 wherein the resole is formulated with about 10 to about 50 weight percent paraformaldehyde.

9. The process of claim 1 wherein the resole is formulated with about 15 to about 45 weight percent nonyl phenol.

10. The process of claim 9 wherein the resole is formulated with about 25 to about 55 weight percent phenol.

11. The process of claim 7 wherein the p-phenyl phenol is present in an amount of from about 20 to about 30 weight percent.

12. The process of claim 9 wherein the nonyl phenol is present in an amount of from about 25 to about 35 weight percent.

13. The process of claim 1 wherein the free formaldehyde content is 1.5% or less by weight.

14. A pultruded product comprising a fibrous reinforcement bound together by a shaped and hardened resin comprising a phenolic resole having a free formaldehyde content of less than or equal to 3.5% by weight with a hardener comprising a resorcinolic novolac.

15. The product of claim 14 when the fibrous reinforcement is selected from the group consisting of a material selected from the group consisting of fibers of glass, metal, synthetic resin, combining metal oxide and mixtures thereof.

16. The product of claim 14 in the form of a fibrous reinforced resin grate.

17. A pultrusion process comprising:
(a) providing a resin system comprising a phenolic resole having a free formaldehyde content and sufficient hardener to generate a DSC profile exhibiting a single broad peak, said free formaldehyde content being less than or equal to 3.5% by weight;
(b) wetting a fibrous reinforcement with said resin system;
(c) shaping the wetted fibrous reinforcement by pultrusion; and
(d) applying heat to cure the resin.

18. The process of claim 17 wherein the hardener is selected from the resorcinol, resorcinol novolac and combinations thereof.

19. The process of claim 17 wherein the resole contains up to 1.5% by weight of free formaldehyde.

20. The process of claim 17 wherein the fibrous reinforcement comprises at least one material selected from the group consisting of yarn, strands, rovings and mat.

21. The process of claim 17, wherein the resole contains not more than 3% by weight of free formaldehyde.

22. The process of claim 1, wherein the resole contains not more than 3% by weight of free formaldehyde.

* * * * *